US008566496B2

(12) United States Patent
Romero et al.

(10) Patent No.: US 8,566,496 B2
(45) Date of Patent: Oct. 22, 2013

(54) DATA PREFETCH IN SAS EXPANDERS (75) Inventors: Gabriel L. Romero, Colorado Springs, CO (US); Frederick G. Smith, Colorado Springs, CO (US)

(73) Assignee: LSI Corporation, San Jose, CA (US)

(*) Notice: Subject to any disclaimer, the term of this patent is extended or adjusted under 35 U.S.C. 154(b) by 274 days.

(21) Appl. No.: 12/960,118

(22) Filed: Dec. 3, 2010

(65) Prior Publication Data

US 2012/0144082 A1 Jun. 7, 2012

(51) Int. Cl.
G06F 13/00 (2006.01)
G06F 13/36 (2006.01)
G06F 9/26 (2006.01)
G06F 9/34 (2006.01)

(52) U.S. Cl.
USPC .......... 710/300; 710/306; 710/314; 710/316; 711/204; 711/213

(58) Field of Classification Search
USPC .......... 710/300, 306, 314, 316; 712/207, 237, 712/239; 711/204, 213
See application file for complete search history.

(56) References Cited

U.S. PATENT DOCUMENTS

| | | | | |
|---|---|---|---|---|
| 5,634,025 A * | 5/1997 | Breternitz, Jr. | ............... | 712/207 |
| 5,983,306 A * | 11/1999 | Corrigan et al. | ............... | 710/310 |
| 6,070,209 A * | 5/2000 | Hausauer | ............... | 710/104 |
| 6,078,996 A * | 6/2000 | Hagersten | ............... | 711/137 |
| 6,286,074 B1 * | 9/2001 | Batchelor et al. | ............... | 710/305 |
| 6,298,407 B1 * | 10/2001 | Davis et al. | ............... | 710/314 |
| 6,578,130 B2 * | 6/2003 | Barrick et al. | ............... | 711/213 |
| 6,636,927 B1 * | 10/2003 | Peters et al. | ............... | 710/309 |
| 6,678,782 B1 * | 1/2004 | Aydemir et al. | ............... | 710/316 |
| 6,721,870 B1 | 4/2004 | Yochai et al. | | |
| 6,792,496 B2 * | 9/2004 | Aboulenein et al. | ............ | 710/306 |
| 6,820,161 B1 * | 11/2004 | Perez | ............... | 710/306 |
| 7,047,327 B1 * | 5/2006 | Young | ............... | 710/20 |
| 7,107,384 B1 * | 9/2006 | Chen et al. | ............... | 710/309 |
| 7,657,690 B1 * | 2/2010 | White et al. | ............... | 710/310 |
| 8,079,031 B2 * | 12/2011 | Santhanakrishnan et al. | ............... | 718/100 |
| 2003/0221039 A1 * | 11/2003 | Bronson et al. | ............... | 710/306 |
| 2004/0193834 A1 * | 9/2004 | Emberling | ............... | 711/213 |
| 2004/0260908 A1 * | 12/2004 | Malik et al. | ............... | 711/213 |
| 2005/0193158 A1 * | 9/2005 | Srinivasan et al. | ............ | 710/300 |

(Continued)

FOREIGN PATENT DOCUMENTS

EP 339797 A2 * 12/1989
JP 55118168 A * 9/1980

(Continued)

OTHER PUBLICATIONS

Park et al., "A Space-efficient On-disk Prefetching Algorithm," Computational Science and its Applications, 2007. ICCSA 2007. International Conference on , pp. 265,272, Aug. 26-29, 2007.*

(Continued)

*Primary Examiner* — Faisal M Zaman
(74) *Attorney, Agent, or Firm* — Suiter Swantz pc llo (57) ABSTRACT A SAS expander collects data access information associated with a nexus and determines whether a data prefetch is appropriate. The SAS expander identifies potential data blocks utilizing previous data requests of the nexus. The SAS expander issues a data request to the target for the potential data blocks. The SAS expander stores the potential data blocks within a prefetch cache for future utilization within a data read.

20 Claims, 3 Drawing Sheets

(56) References Cited

U.S. PATENT DOCUMENTS

| | | |
|---|---|---|
| 2006/0136688 A1 | 6/2006 | Pang et al. |
| 2007/0201752 A1* | 8/2007 | Gormish et al. ............... 382/232 |
| 2008/0263393 A1* | 10/2008 | Shirogane et al. ................ 714/7 |
| 2009/0138672 A1 | 5/2009 | Katsuragi et al. |
| 2010/0088469 A1* | 4/2010 | Motonaga et al. ............ 711/113 |
| 2012/0066677 A1* | 3/2012 | Tang ................................. 718/1 |
| 2012/0084511 A1* | 4/2012 | Dooley et al. ................. 711/122 |

FOREIGN PATENT DOCUMENTS

| | | | | |
|---|---|---|---|---|
| JP | 61005358 | A | * | 1/1986 |
| JP | 61221966 | A | * | 10/1986 |
| JP | 02127742 | A | * | 5/1990 |
| JP | 2002171560 | A | * | 6/2002 |
| WO | WO 9966690 | A1 | * | 12/1999 |
| WO | WO2007005797 | | | 1/2007 |

OTHER PUBLICATIONS

Kim et al., "Optimizing Prefetch in a Residential Gateway with Networked Storage Systems," Multimedia and Expo, 2005. ICME 2005. IEEE International Conference on , pp. 1050,1053, Jul. 6-6, 2005.*

Sette et al., "Analysis of Prediction and Replacement Algorithms Applied to Real Workload for Storage Devices," Modeling, Analysis & Simulation of Computer and Telecommunication Systems (MAS-COTS), 2012 IEEE 20th International Symposium on , pp. 507,509, Aug. 7-9, 2012.*

* cited by examiner

DATA PREFETCH IN SAS EXPANDERS

TECHNICAL FIELD

The present disclosure generally relates to the field of Serial Attached Small Computer System Interface (SAS) devices, and more particularly to a device, system, and method for performing data prefetch utilizing SAS expanders.

BACKGROUND

In Serial Attached SCSI, devices are SAS initiators, SAS targets, or SAS expanders. SAS initiators are devices that originate device service requests and task management requests. SAS targets are devices that receive and process requests from SAS targets. SAS expanders are devices utilized to facilitate communication between multiple SAS initiators or targets to a single port. In SAS topologies, multiple SAS expanders may be connected to each other in a cascaded fashion. A SAS initiator or a SAS target may be busy performing other tasks when multiple requests to that SAS initiator or SAS target take place within a SAS topology.

SUMMARY

A method for facilitating a data read in a storage system includes, but is not limited to: collecting data access information associated with a connection between an initiator and a target, determining whether the connection between the initiator and the target exceeds a utilization threshold, the determining based on the data access information associated with the connection between the initiator and the target, receiving a first data request from the initiator for at least one first data block of the target, identifying at least one second potential data block of the target for inclusion within a future data request from the initiator based on the first data request upon determining the connection between the initiator and the target exceeds the utilization threshold, issuing a second data request to the target for the at least one second potential data block, receiving the at least one second potential data block from the target, and storing, within a SAS Expander, the at least one second potential data block from the target.

A system may include, but is not limited to: means for collecting data access information associated with a connection between an initiator and a target, means for determining whether the connection between the initiator and the target exceeds a utilization threshold, the determining based on the data access information associated with the connection between the initiator and the target, means for receiving a first data request from the initiator for at least one first data block of the target, means for identifying at least one second potential data block of the target for inclusion within a future data request from the initiator based on the first data request upon determining the connection between the initiator and the target exceeds the utilization threshold, means for issuing a second data request to the target for the at least one second potential data block, means for receiving the at least one second potential data block from the target, and means for storing the at least one second potential data block from the target.

A SAS Expander device may include, but is not limited to: a first port for communicatively coupling with an initiator for data communications, a second port for communicatively coupling with a target for data communications, a cache memory for storing data, and a processor communicatively coupled to the first port, the second port, and the cache memory, the processor configured to execute a method for facilitating a data read, the method comprising the steps of: collecting data access information associated with a connection between a initiator and a target, determining whether the connection between the initiator and the target exceeds a utilization threshold, the determining based on the data access information associated with the connection between the initiator and the target, receiving a first data request from the initiator for at least one first data block of the target, identifying at least one second potential data block of the target for inclusion within a future data request from the initiator based on the first data request upon determining the connection between the initiator and the target exceeds the utilization threshold, issuing a second data request to the target for the at least one second potential data block, receiving the at least one second potential data block from the target, and storing the at least one second potential data block from the target within the cache memory.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
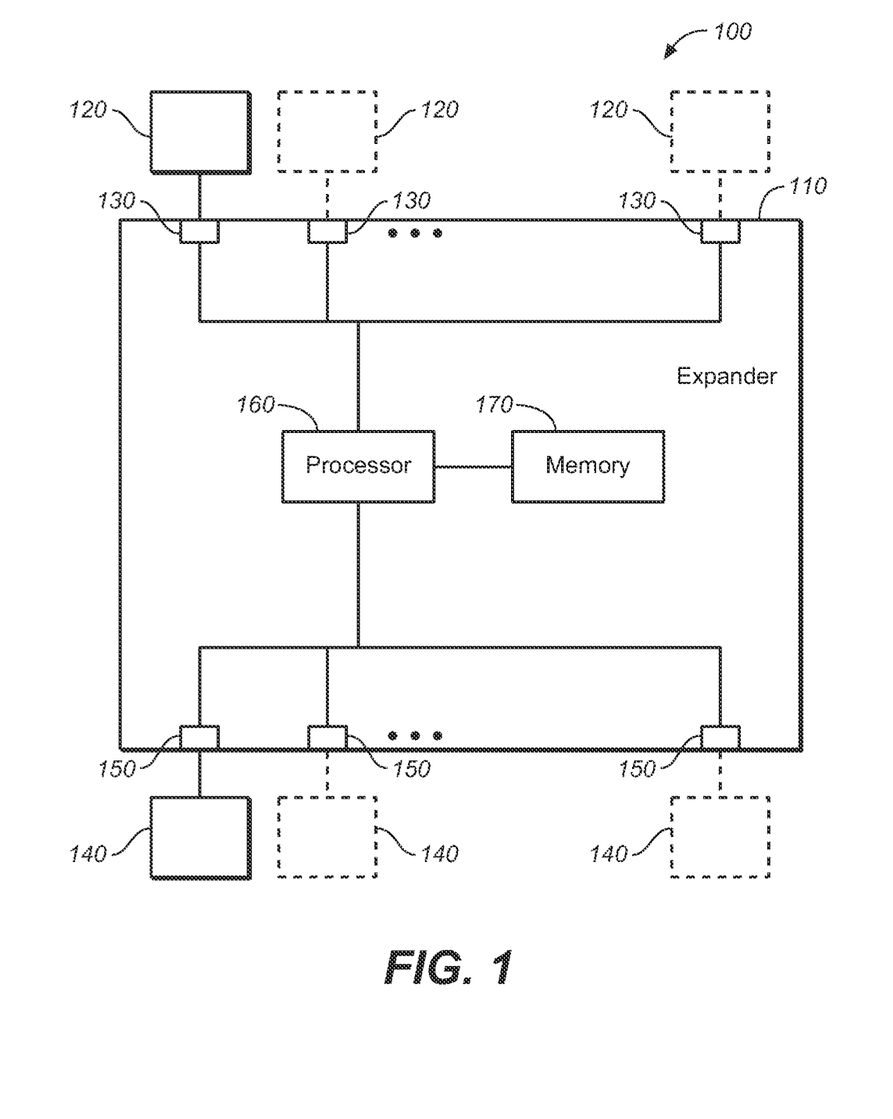
FIG. 1 is a block diagram illustrating a network topology utilizing a SAS expander.

A Serial Attached Small Computer System Interface (SAS) network featuring a SAS expander in accordance with an exemplary embodiment of the present disclosure is shown is FIG. 1. The network 100 may include SAS expander 110. Network 100 may include one or more source devices 120 connected to expander 110 for data communications. For example, a source device 120 may include an initiator (ex—host system, server system) or another SAS expander. The one or more source devices 120 may be connected to expander 110 via a source device port 130 of expander 110. Network 100 may include one or more destination devices 140 connected to expander 110 for data communications. For example, a destination device 140 may include a target (ex—SAS disk, SAS-compatible disk, SAS disk array, or SATA disk array) or another SAS expander. The one or more destination devices 140 may be connected to expander 110 via a destination device port 150 of expander 110.

Expander 110 may further include a processor 160 for control and operation of expander 110. Expander 110 may further include a memory 170 communicatively coupled to processor 160 for the storage of data within expander 110. Expander 110 may be configured to establish a connection between an initiator connected to expander 110 via source device port 130 and a target connected to expander 110 via destination device port 150. Expander 110 may establish a connection for an initiator directly connected to expander 110 via source device port 130 (ex—source device 120) or may establish a connection for an initiator connected to expander 110 via a network of one or more expanders connected to expander 110 via source device port 130. Expander 110 may establish a connection with a target directly connected to expander 110 via source device port 130 (ex—destination device 120) or may establish a connection with a target connected to expander 110 via a network of one or more expanders connected to expander 110 via destination device port 150. A connection established including a particular initiator of network 100 and a particular target of network 100 is referred to as a nexus. As shown in FIG. 1, processor 160 and memory 170 may operate within expander 110. In another embodiment, one or more of processor 160 and memory 170 may operate external to expander 110 as part of a storage system.

Processor 160 of expander 110 may collect data access information associated with a particular nexus of network 100. Link utilization information may include information associated with a single port (ex—one of source device port 130 or destination device port 150). For example, link utilization information may include one or more of utilization ratios (ex—a ratio of the time the link is utilized to the time the link is established) or bandwidth requirements (ex—the rate of data transfer over the link). Processor 160 may collect multiple sets of link utilization information for a connection established for a particular initiator and a particular target and adapt the link utilization information to provide nexus utilization information. Nexus utilization information may include one or more of nexus utilization ratios (ex—a ratio of the time the nexus is utilized to the time the nexus is established) or nexus bandwidth requirements (ex—the rate of data transfer over the nexus). Processor 160 may collect data access information associated with a particular nexus of network 100 via nexus utilization information.

Data access information associated with a particular nexus of network 100 may further include information associated with a Store and Forward process performed by expander 110. In a Store and Forward process, an expander may accept connections from an initiator. The expander may buffer outgoing frames from the initiator prior to establishing a connection with the desired target of the connection. Performing a Store and Forward process may provide an expander access to data access information including one or more of a payload size of a connection (ex—the amount of data being transferred within a single frame), one or more tags associated with the data of a connection (ex—the assigned identifier of a single input/output), Logical Block Addresses (LBAs) associated with the connection, or commands associated with the connection. In an example, a host may initiate a connection to a drive via an expander. In another example, a drive may initiate a connection to a host via an expander. Store and Forward data access information may be collected and adapted by processor 160 to provide data access information associated with a particular nexus of network 100. Processor 160 may collect data access information associated with a particular nexus of network 100 via the Store and Forward data access information.

Processor 160 may adapt one or more of Store and Forward data access information or link utilization information to provide information associated with a frequency of utilization of a particular nexus of network 100. Further, processor 160 may adapt one or more of Store and Forward data access information or link utilization information to provide information associated with an amount of data transferred over a particular nexus of network 100.

Processor 160 may utilize information associated with a particular nexus to determine whether a data prefetch operation is appropriate for a particular nexus of network 100 (ex—whether a particular nexus of network 100 has high utilization). A utilization threshold may include one or more types of information associated with a particular nexus. For example, processor 160 may determine whether data access information associated with a particular nexus of network 100 meets or exceeds a utilization threshold. In one example, processor 160 may utilize a matrix to determine whether the information associated with a particular nexus meets or exceeds a utilization threshold. A utilization threshold may be programmable. Further, a utilization threshold may be user-configurable.

Processor 160 may identify data blocks for a data prefetch operation. Further, processor 160 may identify data blocks for a data prefetch operation upon determining whether a data prefetch operation is appropriate for a particular nexus of network 100. For example, processor 160 may receive a data read request for a nexus (ex—the data read request is issued by a initiator of the nexus and the data read request is directed to a target of the nexus). The data read request may be for an original data set. Processor 160 may have determined a data prefetch operation is appropriate for the nexus associated with the data read request previous to receiving the data read request. In another embodiment, the processor 160 may determine whether the data prefetch operation is appropriate for the nexus associated with the data read request subsequent to receiving the data read request.

Processor 160 may identify a potential data set for a data prefetch operation based on the original data set. For example, processor 160 may identify a potential data set based on proximity to the original data set (ex—the potential data set is located in a LBA proximal to an LBA of the original data set). In another example, processor 160 may identify a potential data set based on a content association with the original data set (ex—the potential data set and the original data set are both parts of a larger data set). In another example, processor 160 may identify a potential data set based on a temporal association with the original data set (ex—a previous data read request for the potential data set has been issued subsequent to a previous data read request for the original data set). In another example, processor 160 may identify a potential data set based on one or more of the above factors or associations (ex—proximital, contentual, and temporal).

Upon identifying a potential data set, processor 160 may issue a data read request for the potential data set to the target of the nexus prior to receiving a data read request from the initiator of the nexus for the potential data set. For example, processor 160 may issue one or more data read requests combining the potential data set with the original data set. In another example (not shown), processor 160 may issue separate data read requests for the potential data set and the original data set. In the example where processor 160 may issue separate data read requests for the potential data set and the original data set, processor 160 may issue the data read request for the potential data set subsequent to issuing the data read request for the original data set. Further, processor 160 may issue the data request for the potential data set at a time of decreased activity (ex—the target is idle) for the target of the data read request (ex—the target of the nexus). Processor 160 may store the potential data set within memory 170 of expander 110 upon receiving the potential data set from the target of the nexus. As used herein, prefetching the potential data set may refer to issuing a data read request for the potential data set to the target of the nexus prior to receiving a data read request from the initiator of the nexus for the potential data set. As used herein, prefetch caching of the potential data set may refer to storing the potential data set within memory 170 prior to receiving a data read request from the initiator of the nexus for the potential data set.

Processor 160 may issue the potential data set to the initiator of the nexus upon receiving a data read request for the potential data set from the initiator of the nexus. In another example, the potential data set stored within memory 170 may be utilized to fulfill data read requests to an initiator other than the initiator of the nexus. Further, processor 160 may issue the potential data set to the initiator from the memory 170 of expander 110 upon determining the potential data set stored in memory 170 is valid. For example, as expander 110 may be directly attached to the target of the nexus, processor 160 may monitor data communications to the target of the nexus to determine whether data stored in the LBAs of the potential data set within the target of the nexus is identical to the potential data set stored in memory 170. Processor 160 may update the potential data set stored within memory 170 upon determining the potential data set stored in memory 170 is invalid. For example, processor 160 may update the potential data set stored within memory 170 via issuing a data read request to the target of the nexus. In another example, processor 160 may update the potential data set stored within memory 170 utilizing the data being written to the target of the nexus via expander 110. In another embodiment, processor 160 may clear the invalid potential data set from memory 170 and permit the data read request for the potential data set to operate without the benefit of data prefetching.

Processor 160 may issue the potential data set to the initiator from memory 170 upon determining the target of the nexus is busy. In another embodiment, processor 160 may issue the potential data set to the initiator from memory 170 whether or not the target of the nexus is busy. In order to issue the potential data set to the initiator from the memory 170, expander 110 may accept the data read request on behalf of the target of the nexus.

Figure 2:
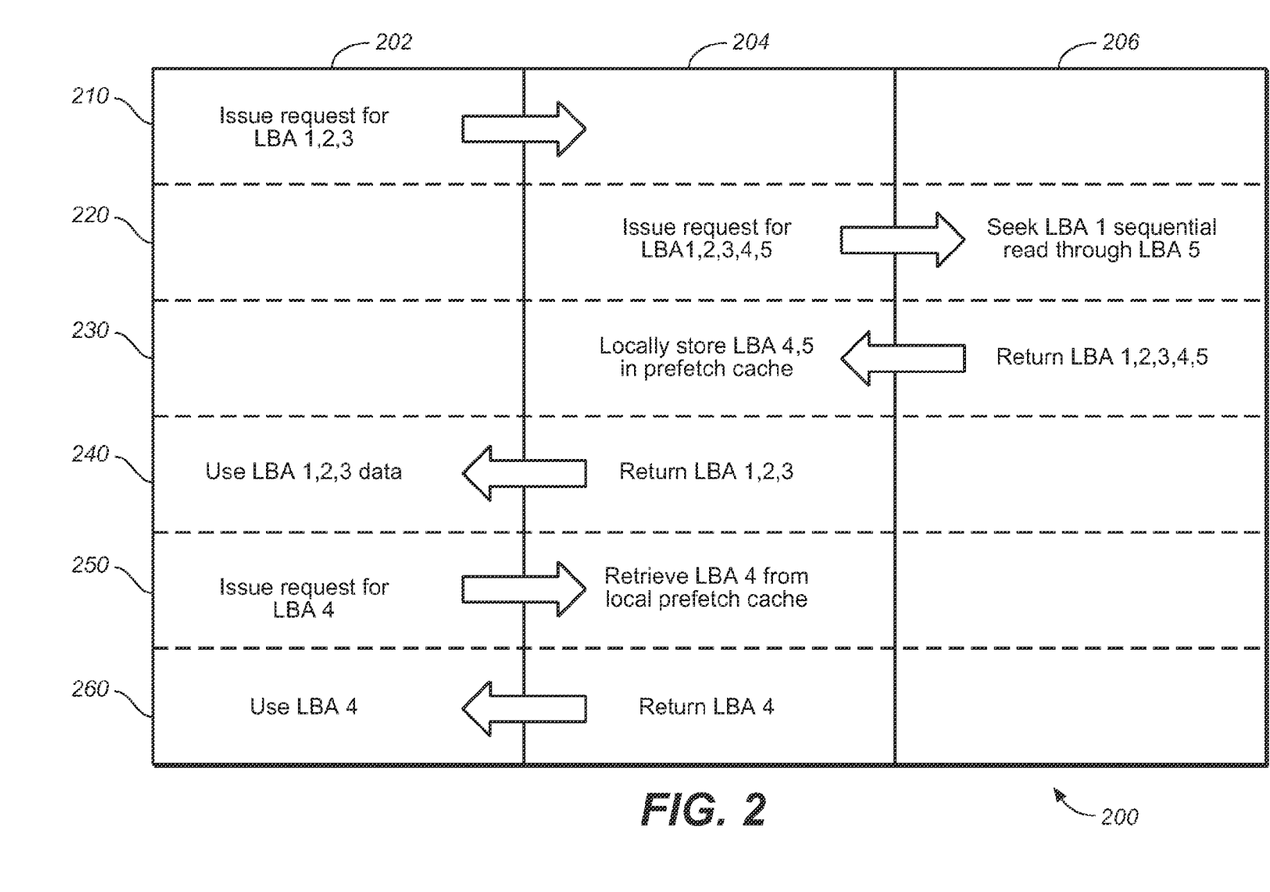
FIG. 2 is a flow diagram illustrating a command sequence procedure for a data prefetch.

Referring generally to FIG. 2, a flow diagram is provided illustrating a command sequence procedure 200 for a data prefetch. Procedure 200 may be implemented in a system as described in FIG. 1 (e.g., a system including a host 202 (ex—an initiator of a nexus), an expander 204, and a drive 206 (ex—a target of a nexus)). Procedure 200 may include a step 210 illustrating a data read request for the data within a set of LBAs of drive 206 (ex—LBAs 1, 2, and 3 as shown in FIG. 2). A processor (ex—processor 160) of expander 204 may determine the nexus between host 202 and drive 206 is a candidate for data prefetch. Further, a processor (ex—processor 160) may determine the nexus between host 202 and drive 206 is a candidate for data prefetch prior to receiving the data read request of step 210. In another example, a processor (ex—processor 160) may determine the nexus between host 202 and drive 206 is a candidate for data prefetch subsequent to receiving the data read request of step 210.

As illustrated in FIG. 2, expander 204 (ex—via processor 160) identifies a potential data set based on the original data set (ex—the data within LBAs 4 and 5 are identified based on the data within LBAs 1, 2, and 3). Consequently, as shown in step 220, expander 204 issues a single data read request for both the original data set and the potential data set (ex—the data within LBAs 1, 2, 3, 4, and 5) to the drive 206 (ex—a target of a nexus). Drive may read the data stored within LBAs 1 through 5 in response to the data read request. For example, as shown in step 220, drive 206 may perform a seek instruction for LBA 1 and a sequential read through LBA 5. Other methods for reading both the original data set and the potential data set are contemplated by the current disclosure.

In another embodiment, expander 204 may issue separate data read requests for the original data set and the potential data set (not shown) to the drive 206. In this particular embodiment, expander 204 may issue the data read request to the drive 206 at a time of reduced activity of the drive 206 (ex—when drive 206 is idle).

Procedure 200 may further include a step 230 representing drive 206 returning the data within LBAs 1 through 5 to expander 204. Expander 204 may store the potential data set within the prefetch cache upon receiving the data from drive 206. For example, processor 160 may store the data from LBAs 4 and 5 of drive 206 within memory 170.

Procedure 200 may further include a step 240 representing expander 204 returning the original data set of the original data read request to the host (ex—an initiator of a nexus). For example, processor 160 may return the requested data from LBAs 1-3 to the issuing host. Host 202 may utilize the requested data.

Procedure 200 may further include step 250 representing host 202 requesting one or more of the potential data blocks from the drive 206. For example, as shown in FIG. 2, host 202 may issue a data read request to expander 204 for the data within LBA 4 of the drive 206. Expander 204 may accept the data read request on behalf of drive 206 upon determining the data stored within memory 170 is valid (ex—the data within memory 170 is identical to the corresponding data within drive 206).

Procedure 200 may further include step 260 representing expander 204 returning the one or more potential data blocks to host 202 from memory 170. Expander 204 may return the one or more potential data blocks to host 202 from memory 170 upon verifying the one or more potential data blocks stored within memory 170 are valid. Expander 204 may verify the data stored within memory 170 is valid subsequent to receiving the data read request for one or more of the potential data blocks. In another example, expander 204 may verify the data stored within memory 170 is valid via monitoring the data written to drive 206 subsequent to storing the potential data blocks within memory 170. Host 202 may utilize the one or more potential data blocks upon receiving the one or more potential data blocks from expander 204.

Figure 3:
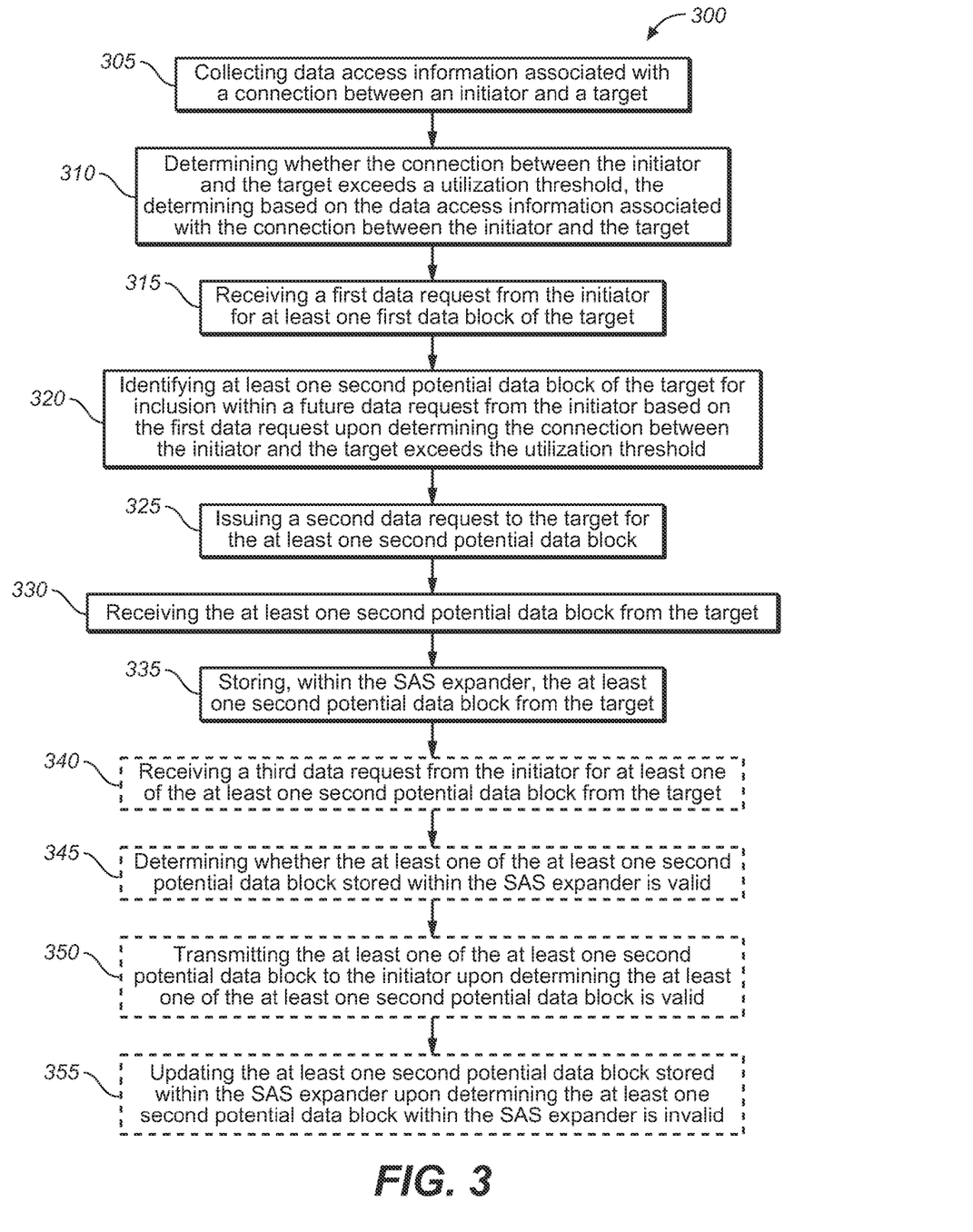
FIG. 3 is a flow diagram illustrating a method for facilitating a data read in a storage system.

Referring generally to FIG. 3, a method for facilitating a data read in a storage system is shown. The method 300 may include the step 305 representing collecting data access information associated with a connection between an initiator (ex—host 202) and a target (ex—drive 206). For example, processor 160 of expander 110 may collect data access information associated with a particular nexus of network 100. Method 300 may further include the step 310 representing determining whether the connection between the initiator (ex—host 202) and the target (ex—drive 206) exceeds a utilization threshold. For example, processor 160 may utilize information associated with a particular nexus to determine whether a data prefetch operation is appropriate for a particular nexus of network 100.

Method 300 may further include the step 315 representing receiving a first data request from the initiator for at least one first data block of the target. For example, processor 160 may receive a data read request for a nexus (ex—the data read request is issued by a initiator of the nexus (ex—host 202) and the data read request is directed to a target of the nexus (ex—drive 206)). The data read request may be for an original data set. Method 300 may further include the step 320 representing identifying at least one second potential data block of the target for inclusion within a future data request from the initiator based on the first data request upon determining the connection between the initiator and the target exceeds the utilization threshold. For example, processor 160 may identify data blocks for a data prefetch operation upon determining whether a data prefetch operation is appropriate for a particular nexus of network 100.

Method 300 may further include the step 325 representing issuing a second data request to the target for the at least one second potential data block. For example, processor 160 may issue a data read request for the potential data set to the target of the nexus prior to receiving a data read request from the initiator of the nexus for the potential data set. Method 300 may further include the step 330 representing receiving the at least one second potential data block from the target. For example, processor 160 may receive the potential data set from the target of the nexus.

Method 300 may further include step 335 representing storing, within the SAS Expander, the at least one second potential data block from the target. For example, processor 160 may store the potential data set within memory 170 of expander 110 upon receiving the potential data set from the target of the nexus. Method 300 may further include step 340 representing receiving a third data request from the initiator for at least one of the at least one second potential data block from the target. For example, processor 160 may receive a data read request for the potential data set from the initiator of the nexus.

Method 300 may further include step 345 representing determining whether the at least one of the at least one second potential data block stored within the SAS Expander is valid. For example, processor 160 may monitor data communications to the target of the nexus to determine whether data stored in the LBAs of the potential data set within the target of the nexus is identical to the potential data set stored in memory 170. Method 300 may further include step 350 representing transmitting the at least one of the at least one second potential data block to the initiator upon determining the at least one of the at least one second potential data block is valid. For example, processor 160 may issue the potential data set to the initiator from the memory 170 of expander 110 upon determining the potential data set stored in memory 170 is valid.

Method 300 may further include step 355 representing updating the at least one second potential data block stored within the SAS Expander upon determining the at least one second potential data block within the SAS Expander is invalid. For example, processor 160 may update the potential data set stored within memory 170 upon determining the potential data set stored in memory 170 is invalid.

In the present disclosure, the methods disclosed may be implemented as sets of instructions or software or firmware readable by a device. Such software may include a program product which employs a computer-readable storage medium including stored computer code which is used to program a processor to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for facilitating a data read in a storage system including a Serial Attached Small Computer System Interface (SAS) Expander, the method comprising:

collecting data access information, the data access information including information associated with a connection between an initiator and a target and information collected via a store-and-forward process of the SAS Expander;

determining whether the connection between the initiator and the target exceeds a utilization threshold based on the data access information which includes the information associated with the connection between the initiator and the target and the information collected via the store-and-forward process of the SAS Expander;

receiving a data request from the initiator for at least one data block of the target;

identifying at least one potential data block of the target for inclusion within a subsequent data request from the initiator based on the data request upon determining the connection between the initiator and the target exceeds the utilization threshold;

issuing, by the SAS Expander, one or more data requests to the target for the at least one data block and the at least one potential data block;

receiving the at least one data block;

receiving the at least one potential data block from the target when the target is not busy processing other tasks upon receiving the at least one data block; and storing, within the SAS Expander, the at least one potential data block from the target upon receiving the at least one potential data block from the target.

2. The method of claim 1, further including:

receiving an additional data request from the initiator for one or more of the at least one potential block of the target;

determining whether the one or more of the at least one potential data block stored within the SAS Expander are valid; and transmitting the one or more of the at least one potential block to the initiator from the at least one potential data block stored within the SAS Expander upon determining that the one or more of the at least one potential data block are valid.

3. The method of claim 1, wherein the information associated with the connection between the initiator and the target includes information associated with at least one of a frequency of utilization of the connection between the initiator and the target or an amount of data transferred over the connection between the initiator and the target.

4. The method of claim 3, wherein the information collected via the store-and-forward process of the Expander includes:

payload size information, tag information, Logical Block Address information, and identification of commands sent over the connection between the initiator and the target.

5. The method of claim 1, wherein the utilization threshold includes:
at least one of a user-configurable utilization threshold and a programmable utilization threshold.

6. The method of claim 1, wherein identifying at least one potential data block of the target for inclusion within a subsequent data request from the initiator based on the data request upon determining the connection between the initiator and the target exceeds the utilization threshold includes:
identifying at least one potential data block of the target based on a preceding sequence of requested data blocks.

7. The method of claim 1, wherein identifying at least one potential data block of the target for inclusion within a subsequent data request from the initiator based on the data request upon determining the connection between the initiator and the target exceeds the utilization threshold includes:
identifying the at least one potential data block based on Logical Block Address proximity to the at least one data block.

8. The method of claim 1, wherein identifying at least one potential data block of the target for inclusion within a subsequent data request from the initiator based on the data request upon determining the connection between the initiator and the target exceeds the utilization threshold includes:
identifying the at least one potential data block based on a content association with the at least one data block.

9. The method of claim 1, wherein issuing, by the SAS Expander, one or more data requests to the target for the at least one data block and the at least one potential data block includes:
issuing, by the SAS Expander, one or more first data requests to the target for the at least one data block; and
issuing, by the SAS Expander, one or more second data requests to the target for the at least one potential data block.

10. The method of claim 1, further including:
updating the one or more of the at least one potential data block stored within the SAS Expander upon determining the one or more of the at least one potential data block within the SAS Expander are invalid.

11. The method of claim 1, wherein receiving the at least one potential data block from the target when the target is not busy processing other tasks upon receiving the at least one data block further comprises:
receiving the at least one potential data block from the target when the target is idle or substantially idle upon receiving the at least one data block.

12. A system, comprising:
means for collecting data access information associated with a connection between an initiator and a target;
means for determining whether the connection between the initiator and the target exceeds a utilization threshold, the determining based on the data access information associated with the connection between the initiator and the target;
means for receiving a data request from the initiator for at least one data block of the target;
means for identifying at least one potential data block of the target for inclusion within a subsequent data request from the initiator based on the first data request upon determining the connection between the initiator and the target exceeds the utilization threshold;

means for issuing, by the SAS Expander, one or more data requests to the target for the at least one data block and the at least one potential data block;
means for receiving the at least one data block;
means for receiving the at least one potential data block from the target when the target is not busy processing other tasks upon receiving the at least one data block; and
means for storing the at least one potential data block from the target of the SAS Expander upon receiving the at least one potential data block from the target;
means for receiving an additional data request from the initiator for one or more of the at least one potential data block;
means for determining whether the one or more of the at least one potential data block stored within the SAS Expander are valid;
means for transmitting the one or more of the at least one potential data block to the initiator upon determining that the one or more of the at least one stored potential data block are valid; and
means for updating the one or more of the at least one potential data block stored within the SAS Expander upon determining that the one or more of the at least one potential data block are invalid.

13. The system of claim 12, wherein the means for collecting data access information associated with the connection between the initiator and the target includes:
means for collecting data access information associated with at least one of a frequency of utilization of the connection between the initiator and the target or an amount of data transferred over the connection between the initiator and the target.

14. The system of claim 12, wherein the data access information associated with the connection between the initiator and the target includes:
payload size information, tag information, Logical Block Address information, or identification of commands sent over the connection between the initiator and the target.

15. The system of claim 12, further including:
means for subsequently updating the one or more of the at least one potential data block stored within the SAS Expander upon subsequently determining that the one or more of the at least one potential data block are invalid.

16. The system of claim 12,
wherein the means for collecting data access information associated with a connection between an initiator and a target, further comprises:
a means for collecting data access information, the data access information including information associated with a connection between an initiator and a target and information collected via a store-and-forward process of the SAS Expander, and
wherein the means for determining whether the connection between the initiator and the target exceeds a utilization threshold, the determining based on the data access information associated with the connection between the initiator and the target, further comprises:
a means for determining whether the connection between the initiator and the target exceeds a utilization threshold, the determining based on the data access information which includes the information associated with the connection between the initiator and the target and the information collected via a store-and-forward process of the SAS Expander.

17. A Serial Attached Small Computer System Interface (SAS) Expander device, comprising:
- a first port for communicatively coupling with an initiator for data communications;
- a second port for communicatively coupling with a target for data communications;
- a cache memory for storing data; and
- a processor communicatively coupled to the first port, the second port, and the cache memory, the processor configured to execute instructions configured to perform a method, the method comprising:
  - collecting data access information associated with a connection between the initiator and the target, the data access information including at least one of: a frequency of utilization of the connection between the initiator and the target; an amount of data transferred over the connection between the initiator and the target; payload size information; tag information; Logical Block Address information; and identification of commands sent over the connection between the initiator and the target;
  - determining whether the connection between the initiator and the target exceeds a utilization threshold, the determining based on the data access information associated with the connection between the initiator and the target;
  - receiving a data request from the initiator for at least one data block of the target;
  - identifying at least one potential data block of the target for inclusion within a subsequent data request from the initiator based on the data request upon determining the connection between the initiator and the target exceeds the utilization threshold;
- issuing, by the SAS Expander, one or more data requests to the target for the at least one data block and the at least one potential data block when the target is not busy processing other tasks;
- receiving the at least one data block;
- receiving the at least one potential data block from the target when the target is not busy processing other tasks upon receiving the at least one data block;
- storing the at least one potential data block from the target within the cache memory of the SAS Expander upon receiving the at least one potential data block from the target;
- receiving an additional data request from the initiator for one or more of the at least one potential data block;
- determining whether the one or more of the at least one potential data block stored within the SAS Expander are valid;
- transmitting the one or more of the at least one potential data block from the cache memory to the initiator upon determining that the one or more of the at least one potential data block are valid; and
- updating the one or more of the at least one potential data block stored within the SAS Expander upon determining that the one or more of the at least one potential data block are invalid.

18. The SAS Expander device of claim 17, wherein identifying at least one potential data block of the target for inclusion within a subsequent data request from the initiator based on the data request upon determining the connection between the initiator and the target exceeds the utilization threshold includes:
- identifying at least one potential data block of the target based on a preceding sequence of requested data blocks.

19. The SAS Expander device of claim 17, wherein identifying at least one potential data block of the target for inclusion within a subsequent data request from the initiator based on the data request upon determining the connection between the initiator and the target exceeds the utilization threshold includes:
- identifying the at least one potential data block based on Logical Block Address proximity to the at least one data block.

20. The SAS Expander device of claim 17,
- wherein collecting data access information associated with a connection between the initiator and the target, the data access information including at least one of: a frequency of utilization of the connection between the initiator and the target; an amount of data transferred over the connection between the initiator and the target; payload size information; tag information; Logical Block Address information; and identification of commands sent over the connection between the initiator and the target, further comprises:
  - collecting data access information, the data access information including information associated with a connection between the initiator and the target and information collected via a store-and-forward process of the SAS Expander, the data access information further including at least one of: a frequency of utilization of the connection between the initiator and the target; an amount of data transferred over the connection between the initiator and the target; payload size information; tag information; Logical Block Address information; and identification of commands sent over the connection between the initiator and the target, and
- wherein determining whether the connection between the initiator and the target exceeds a utilization threshold, the determining based on the data access information associated with the connection between the initiator and the target, further comprises:
  - determining whether the connection between the initiator and the target exceeds the utilization threshold, the determining based on the data access information which includes the information associated with the connection between the initiator and the target and the information collected via the store-and-forward process of the SAS Expander.

* * * * *